US012127232B2

(12) United States Patent
Mangrulkar et al.

(10) Patent No.: US 12,127,232 B2
(45) Date of Patent: Oct. 22, 2024

(54) DETECTION AND MITIGATION OF TIME OF FLIGHT INTERFERENCE EVENTS

(71) Applicant: T-MOBILE INNOVATIONS LLC, Overland Park, KS (US)

(72) Inventors: Sandeep Padmakar Mangrulkar, Chantilly, VA (US); Khurram Naveed, Bartlett, IL (US); Rene Diaz, Chicago, IL (US); Anirudh Krishna, Bartlett, IL (US)

(73) Assignee: T-Mobile Innovations LLC, Overland Park, KS (US)

( * ) Notice: Subject to any disclaimer, the term of this patent is extended or adjusted under 35 U.S.C. 154(b) by 128 days.

(21) Appl. No.: 17/563,947

(22) Filed: Dec. 28, 2021

(65) Prior Publication Data

US 2023/0209585 A1 Jun. 29, 2023

(51) Int. Cl.
*H04W 4/00* (2018.01)
*H04W 72/541* (2023.01)
*H04W 16/28* (2009.01)

(52) U.S. Cl.
CPC .......... *H04W 72/541* (2023.01); *H04W 16/28* (2013.01)

(58) Field of Classification Search
CPC . H04W 72/541; H04W 16/28; H04W 52/143; H04W 52/247; H04W 52/42; H04W 24/02; H04W 52/243; H04W 52/367; H04B 17/345; H04B 17/346; H04B 17/253
See application file for complete search history.

(56) References Cited

U.S. PATENT DOCUMENTS

| | | | | |
|---|---|---|---|---|
| 10,798,630 | B1 * | 10/2020 | Azem | H04W 36/24 |
| 11,134,502 | B2 * | 9/2021 | Abdelmonem | H04W 24/08 |
| 2014/0274094 | A1 * | 9/2014 | Abdelmonem | H04W 40/16 |
| | | | | 455/452.1 |
| 2017/0338883 | A1 * | 11/2017 | Clarke | H04W 24/02 |
| 2020/0236687 | A1 * | 7/2020 | Abdelmonem | H04W 4/023 |
| 2020/0413459 | A1 * | 12/2020 | Yoon | H04W 52/40 |
| 2022/0038914 | A1 * | 2/2022 | Beck | H04W 52/244 |

FOREIGN PATENT DOCUMENTS

| | | | | |
|---|---|---|---|---|
| CN | 103476041 A | * | 12/2013 | |
| GB | 2378858 A | * | 2/2003 | .......... H04W 72/082 |

* cited by examiner

*Primary Examiner* — Thai D Hoang
(74) *Attorney, Agent, or Firm* — Shook, Hardy & Bacon L.L.P.

(57) ABSTRACT

Methods and systems for detecting and mitigating the effects of time of flight interference of a radio frequency (RF) signal are provided. A wireless communication network may determine, based on one or more parameters being sufficiently different than a baseline value, that time of flight interference is occurring based on the undesirable propagation of a first cell's downlink signals into a second cell's coverage area. In response to the determination, the network may identify an offending base station and modify the RF transmission characteristics of the offending base station to prevent or mitigate the impact of the interference event on the RF signal's propagation.

20 Claims, 5 Drawing Sheets

DETECTION AND MITIGATION OF TIME OF FLIGHT INTERFERENCE EVENTS

TECHNICAL FIELD

The present invention relates to wireless telecommunications with antennas and radio frequency (RF) signal interference.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

In aspects set forth herein, a characteristic of one or more antennas emitting a radio frequency (RF) signal and/or the RF signal, itself, is modified in response to a determination that a meteorologic condition is affecting the propagation of the RF signal. Meteorologic events such as a tropospheric duct, or geographic features such as bodies of water, often affect the propagation of signals by reflecting or refracting them in unintended directions or for distances much greater than anticipated or intended. Consequently, a wireless communication device not intended to be in communication with a first base station may receive signals from the first base station, causing interference with respect to signals received by the device from a second base station, with which the device intends to/should communicate. The present disclosure is directed to systems and methods that identify and mitigate telecommunications-performance-impairing interference.

BRIEF DESCRIPTION OF THE DRAWINGS

The present technology is described in detail herein with reference to the drawing figures, which are intended to be exemplary and non-limiting in nature, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. Unless otherwise indicated, acronyms are used in their common sense in the telecommunication arts as one skilled in the art would readily comprehend. Further, various technical terms are used throughout this description. An illustrative resource that fleshes out various aspects of these terms can be found in Newton's Telecom Dictionary, 31st Edition (2018). As used herein, the term "network access technology (NAT)" is synonymous with wireless communication protocol and is an umbrella term used to refer to the particular technological standard/protocol that governs the communication between a UE and a base station; examples of network access technologies include 3G, 4G, 5G, 802.11x, and the like. The term "operator" is used to refer to an entity (e.g., a corporation) that provides networked connectivity to one or more UEs; examples of operators include wireless telecommunication carriers such as T-Mobile, AT&T, Verizon, and the like. The term "base station" is used in its generic and literal sense and refers to any terrestrial radio station that transmits and/or receives signals to/from one or more destinations (e.g., UEs); a macro cell, small cell, and femto cell are all considered a base station for the purpose of the present disclosure; a single base station may be configured to serve one or more sectors using one or more NATs on one or more carrier frequencies. Certain signal processing techniques that are known in the art are referred to by their acronyms, such as time division multiplexing (TDM), frequency division multiplexing (FDM), orthogonal frequency division multiplexing (OFDM), and code division multiplexing (CDM).

Additionally, as used in this disclosure, "ducting" or "time of flight interference" describe a meteorological- or geographical-caused RF phenomenon that causes or results in a RF signal being propagated, reflected, or refracted differently than intended by an emitting source. For example, when a RF signal is intended to provide wireless service for wireless communication devices within a 5 mile radius, but due to an atmospheric boundary layer or body of water, the RF signal is propagated for 50 miles, ducting is occurring, causing time of flight interference in the area 50 miles from the emitter. A "mobile device," as used herein, is a device that has the capability of using a wireless communications network, and may also be referred to as a "user device," "wireless communication device," or "user equipment (UE)." A mobile device may take on a variety of forms, such as a personal computer (PC), a laptop computer, a tablet, a mobile phone, a personal digital assistant (PDA), a server, or any other device that is capable of communicating with other devices using a wireless communications network. Additionally, embodiments of the present technology may be used with different technologies or standards, including, but not limited to, CDMA 1XA, GPRS, EvDO, TDMA, GSM, WiMax technology, LTE, and/or LTE Advanced, among other technologies and standards.

Embodiments of the technology may be embodied as, among other things, a method, a system, and/or a computer-program product. Accordingly, the embodiments may take the form of a hardware embodiment, or an embodiment combining software and hardware. In one embodiment, the technology may take the form of a computer-program product that includes computer-useable instructions embodied on one or more computer-readable media.

Computer-readable media may include both volatile media, non-volatile media, removable media, non-removable media, and contemplate media readable by a database, a switch, and/or various other network devices. Network switches, routers, and related components are conventional in nature, as are methods of communicating with the same. By way of example, and not limitation, computer-readable media may include computer storage media and/or communications media. Computer storage media, or machine-readable media, may include media implemented in any method or technology for storing information. Examples of stored information include computer-useable instructions, data structures, program modules, and other data representations. Computer storage media may include, but are not limited to, RAM, ROM, EEPROM, flash memory or other memory technology, CD-ROM, digital versatile discs (DVD), holographic media or other optical disc storage, magnetic cassettes, magnetic tape, magnetic disk storage, and other storage devices. These memory components may store data momentarily, temporarily, and/or permanently.

Communications media typically store computer-useable instructions—including data structures and program modules—in a modulated data signal. The term "modulated data signal" refers to a propagated signal that has one or more of its characteristics set or changed to encode information in the signal. Communications media includes any information-delivery media. By way of example, but not limitation, communications media may include wired media, such as a wired network or direct-wired connection, and wireless media such as acoustic, infrared, radio, microwave, spread-spectrum, and other wireless media technologies. Combinations of the above are included within the scope of computer-readable media. Communications media do not include signals per se.

In brief, and at a high level, this disclosure describes, among other things, methods and systems for determining that time of flight interference is occurring, mitigating the interference by modifying an offending base station, and then restoring the offending base station once it is determined the interference is no longer occurring. One or more user devices served by a victim base station may experience service degradations as a result of downlink signals from the offending (distant) base station. Particularly in TDM system, the downlink signals from the offending base station may be received at a user device at a time when it is slotted to transmit in the uplink to the victim base station. As a result, call drops, call failures, and slowing of service are likely to occur. Instead of relying on network engineers or customer service to manually identify that time of flight interference is occurring and then relying on debugging/troubleshooting, or sweeping network adjustment to correct the issue, the present system automatically determines that time of flight interference is occurring, identifies the specific offending base station, performs one or more mitigation measures until the interference ceases, and then restores the system if it is determined that doing so will not recreate the interference.

In one exemplary embodiment of the present technology, a system for mitigating time of flight interference in a wireless telecommunication environment is provided. The system may comprise a first base station configured to transmit a first set of downlink signals to a first coverage area using one or more antennas, the first set of downlink signals having a first downlink profile. The system may further comprise one or more computer processing components configured to perform operations comprising determining that the first base station is causing time of flight interference in a second coverage area based on one or more time of flight interference parameters exceeding a predetermined threshold in the second coverage area. The one or more computer processing components may further be configured to communicate an instruction to the first base station to transmit a second set of downlink signals to a third coverage area using the one or more antennas, the second set of downlink signals having a second downlink profile, wherein the first coverage area comprises the third coverage area.

In another exemplary embodiment of the present technology, a method for mitigating time of flight interference in a wireless telecommunication environment is provided. The method comprises determining that a first base station is causing time of flight interference in a second coverage area based on one or more time of flight interference parameters exceeding a predetermined threshold in the second coverage area. The method further comprises communicating an instruction to the first base station to transmit a second set of downlink signals to a third coverage area using the one or more antennas, the second set of downlink signals having a second downlink profile, wherein the first coverage area comprises the third coverage area.

In yet another exemplary embodiment of the present technology, one or more computer-readable media having computer executable instructions embodied thereon are provided that, when executed, perform a method for a method for mitigating time of flight interference in a wireless telecommunication environment. The method comprises determining that a first base station is causing time of flight interference in a second coverage area based on one or more time of flight interference parameters exceeding a predetermined threshold in the second coverage area. The method further comprises communicating an instruction to the first base station to transmit a second set of downlink signals to a third coverage area using the one or more antennas, the second set of downlink signals having a second downlink profile, wherein the first coverage area comprises the third coverage area.

Figure 1:
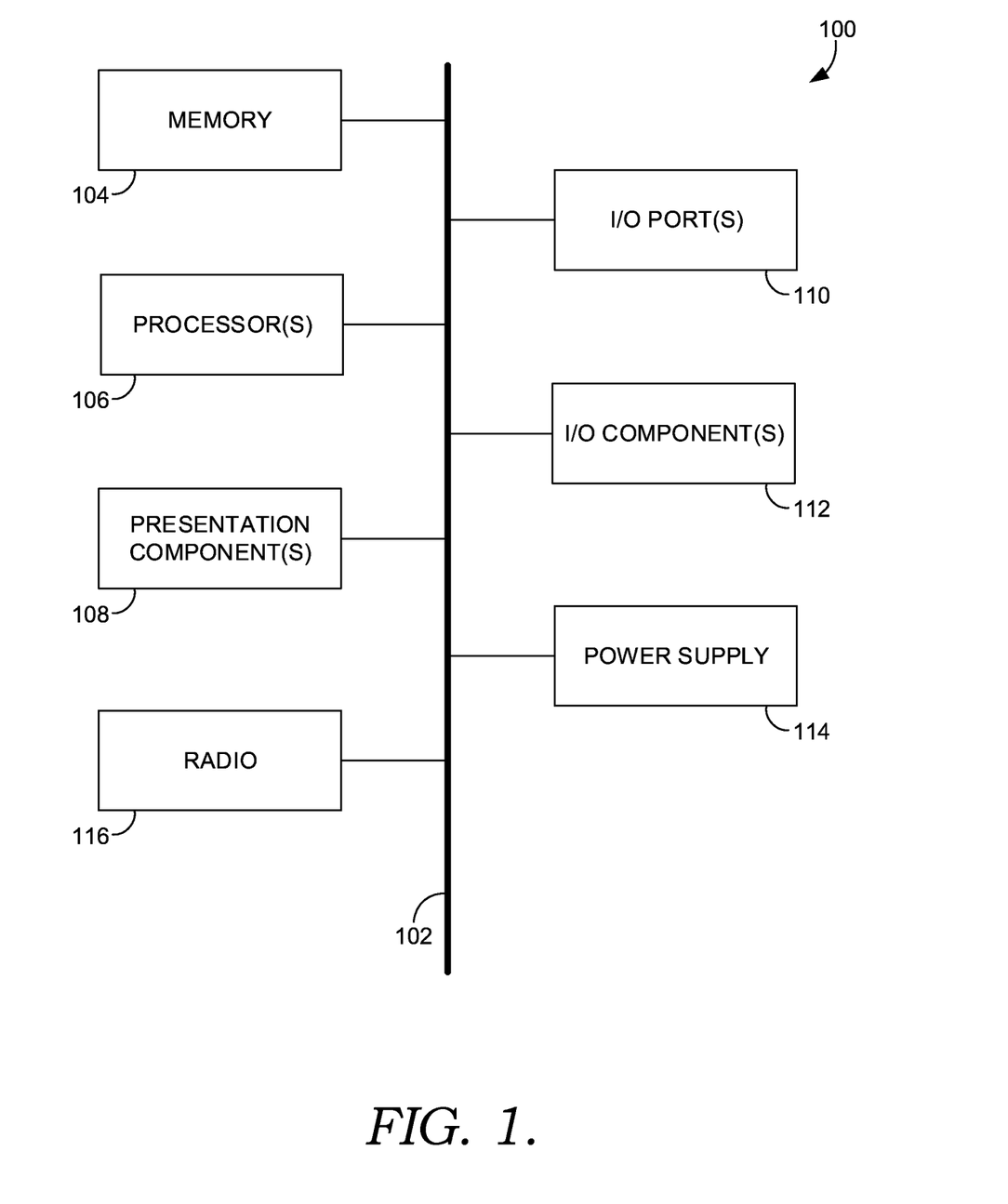
FIG. 1 depicts an exemplary computing environment suitable for use in implementation of the present disclosure.

Referring to the drawings in general, and initially to FIG. 1, an exemplary computing environment 100 suitable for practicing embodiments of the present technology is provided. Computing environment 100 is but one example, and is not intended to suggest any limitation as to the scope of use or functionality of the embodiments discussed herein. Neither should the computing environment 100 be interpreted as having any dependency or requirement relating to any one or a combination of components illustrated. It should be noted that although some components in FIG. 1 are shown in the singular, they may be plural. For example, the computing environment 100 might include multiple processors and/or multiple radios. As shown in FIG. 1, computing environment 100 includes a bus 102 that directly or indirectly couples various components together, including memory 104, processor(s) 106, presentation component(s) 108 (if applicable), radio(s) 116, input/output (I/O) port(s) 110, input/output (I/O) component(s) 112, and power supply 114. More or fewer components are possible and contemplated, including in consolidated or distributed form.

Memory 104 may take the form of memory components described herein. Thus, further elaboration will not be provided here, but it should be noted that memory 104 may include any type of tangible medium that is capable of storing information, such as a database. A database may be any collection of records, data, and/or information. In one embodiment, memory 104 may include a set of embodied computer-executable instructions that, when executed, facilitate various functions or elements disclosed herein. These embodied instructions will variously be referred to as "instructions" or an "application" for short. Processor 106 may actually be multiple processors that receive instructions and process them accordingly. Presentation component 108 may include a display, a speaker, and/or other components that may present information (e.g., a display, a screen, a lamp (LED), a graphical user interface (GUI), and/or even lighted keyboards) through visual, auditory, and/or other tactile cues.

Radio 116 may facilitate communication with a network, and may additionally or alternatively facilitate other types of wireless communications, such as Wi-Fi, WiMAX, LTE, and/or other VoIP communications. In various embodiments, the radio 116 may be configured to support multiple technologies, and/or multiple radios may be configured and utilized to support multiple technologies. The input/output (I/O) ports 110 may take a variety of forms. Exemplary I/O ports may include a USB jack, a stereo jack, an infrared port, a firewire port, other proprietary communications ports, and the like. Input/output (I/O) components 112 may comprise keyboards, microphones, speakers, touchscreens, and/or any other item usable to directly or indirectly input data into the computing environment 100. Power supply 114 may include batteries, fuel cells, and/or any other component that may act as a power source to supply power to the computing environment 10 or to other network components, including through one or more electrical connections or couplings. Power supply 26 may be configured to selectively supply power to different components independently and/or concurrently.

Figure 2:
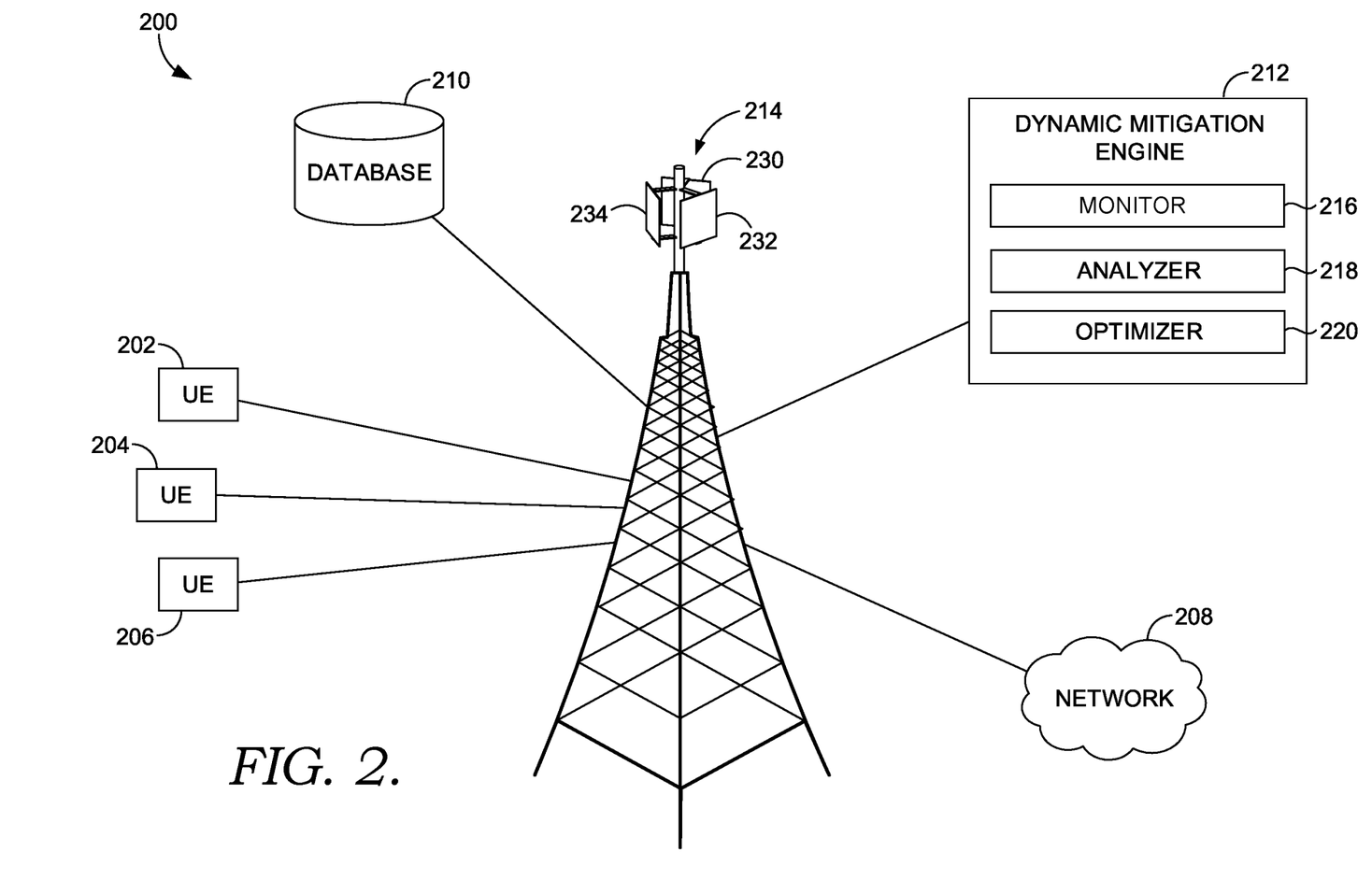
FIG. 2 illustrates a diagram of an exemplary network environment in which implementations of the present disclosure may be employed.

FIG. 2 provides an exemplary network environment in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 includes one or more user devices (e.g., user devices 202, 204, and 206), cell site 214, network 208, database 210, and dynamic meteorologic mitigation engine 212. In network environment 200, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, an access point, and any combination of these delineated devices, or any other device that communicates via wireless communications with a cell site 214 in order to interact with a public or private network.

In some aspects, the user devices 202, 204, and 206 correspond to computing device 100 in FIG. 1. Thus, a user device may include, for example, a display(s), a power source(s) (e.g., a battery), a data store(s), a speaker(s), memory, a buffer(s), a radio(s) and the like. In some implementations, the user devices 202, 204, and 206 comprises a wireless or mobile device with which a wireless telecommunication network(s) may be utilized for communication (e.g., voice and/or data communication). In this regard, the user device may be any mobile computing device that communicates by way of a wireless network, for example, a 3G, 4G, 5G, LTE, CDMA, or any other type of network.

In some cases, the user devices 202, 204, and 206 in network environment 200 may optionally utilize network 208 to communicate with other computing devices (e.g., a mobile device(s), a server(s), a personal computer(s), etc.) through cell site 214. The network 208 may be a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) may provide connectivity in various implementations. Network 208 may include multiple networks, as well as being a network of networks, but is shown in more simple form so as to not obscure other aspects of the present disclosure.

Network 208 may be part of a telecommunication network that connects subscribers to their service provider. In aspects, the service provider may be a telecommunications service provider, an internet service provider, or any other similar service provider that provides at least one of voice telecommunications and data services to any or all of the user devices 202, 204, and 206. For example, network 208 may be associated with a telecommunications provider that provides services (e.g., LTE) to the user devices 202, 204, and 206. Additionally or alternatively, network 208 may provide voice, SMS, and/or data services to user devices or corresponding users that are registered or subscribed to utilize the services provided by a telecommunications provider. Network 208 may comprise any communication network providing voice, SMS, and/or data service(s), using any one or more communication protocols, such as a 1x circuit voice, a 3G network (e.g., CDMA, CDMA2000, WCDMA, GSM, UMTS), a 4G network (WiMAX, LTE, HSDPA), or a 5G network. The network 208 may also be, in whole or in part, or have characteristics of, a self-optimizing network.

In some implementations, cell site 214 is configured to communicate with the user devices 202, 204, and 206 that are located within the geographical area defined by a transmission range and/or receiving range of the radio antennas of cell site 214. The geographical area may be referred to as the "coverage area" of the cell site or simply the "cell," as used interchangeably hereinafter. Cell site 214 may include one or more base stations, base transmitter stations, radios, antennas, antenna arrays, power amplifiers, transmitters/receivers, digital signal processors, control electronics, GPS equipment, and the like. In particular, cell site 214 may be configured to wirelessly communicate with devices within a defined and limited coverage area. For the purposes of the present disclosure, it may be assumed that it is undesirable and unintended by the network 208 that any cell site other than cell site 214 provide wireless connectivity to the user devices 202, 204, and 206 while the user devices 202, 204, and 206 are geographically situated in the service area of cell site 214. Because the cell site 214 is the intended base station for the user devices 202, 204, and 206, it may be referred to herein as the victim base station when time of flight interference is determined to exist within the coverage area of the cell site 214, wherein the source of the downlink signal that causes the time of flight interference is from a distant base station (referred to herein as an offending base station). In an exemplary aspect, the cell site 214 comprises a base station that serves at least one sector of the cell associated with the cell site 214, and at least one transmit antenna for propagating a signal from the base station to one or more of the user devices 202, 204, and 206. In other aspects, the cell site 214 may comprise multiple base stations and/or multiple transmit antennas for each of the one or more base stations, any one or more of which may serve at least a portion of the cell. For example, the cell site may comprise a first antenna array 230, a second antenna array 232, and a third antenna array 234, wherein each of the antenna arrays serves a distinct sector (i.e., portion) of the coverage area of the cell 214. In some aspects, the cell site 214 may comprise one or more macro cells (providing wireless coverage for users within a large geographic area) or it may be a small cell (providing wireless coverage for users within a small geographic area).

As shown, cell site 214 is in communication with dynamic mitigation engine 212, which comprises various components that are utilized, in various implementations, to perform one or more methods for determining that time of flight interference is occurring within cell site 214's coverage area and implementing one or more mitigation measures. In some implementations, dynamic mitigation engine 212 comprises components including a monitor 216, an analyzer 218, and an optimizer 220. However, in other implementations, more or less components than those shown in FIG. 2 may be utilized to carry out aspects of the invention described herein. The components of dynamic mitigation engine 212 may take any one or more of many forms, but specifically may comprise one or more processors and/or servers configured to perform the functions described herein.

The monitor 216 of the dynamic mitigation engine 212 is generally responsible for monitoring information that may be relevant to making a determination that time of flight interference is taking place within the coverage area of cell site 214 and for determining when ducting mitigation measures can be restored. The monitor 216 may receive one or more time of flight interference parameters from either the cell site 214, various user devices, such as the user devices 202, 204, and 206, or another receiver, when located within the coverage area of cell site 214. The one or more time of flight interference parameters may include any one or more of an uplink channel failure rate (e.g., a physical uplink shared channel (PUSCH) failure/NACK rate), radio link control (RLC) failure rate (e.g., RLC protocol data unit (PDU) retransmission rate), voice call failure rate (e.g., voice over LTE (VoLTE) failure rate, voice over new radio (VoNR) failure rate, or the like, which may be collectively/generically referred to herein as voice over radio access technology), voice/data drops (e.g., VoLTE connection drops, VoNR connection drops), and an interference nose level (e.g., average uplink interference over thermal noise level). In other aspects, the monitor 216 may deduce any of the one or more time of flight intereference parameters identified above based on raw network data that is measured, observed, or otherwise acquired by the cell site 214, one or more of the UEs, or any other suitable device. The monitor 216 is further configured to communicate the one or more time of flight interference parameters to the analyzer 218.

The analyzer 218 is generally responsible for determining if time of flight of interference is occurring based on the one or more time of flight interference parameters and identifying the offending base station. The analyzer 218 receives the one or more time of flight interference parameters from the monitor 216 at an operator-defined frequency during an operator-defined sampling period; for example, the analyzer 218 may receive a value associated with each of the one or more time of flight interference parameters every minute during a 15 minute reporting output period (ROP). The one or more time of flight interference parameters values during the sampling period may be averaged, weighted, or otherwise processed to determine one or more representative values for each of the one or more time of flight interference parameters that represents the sampling period. The analyzer 218 may compare the representative value during a particular sampling period against historical baseline values to determine if the representative value is greater than a predetermined threshold different than the baseline. In one specific and non-limiting example, the one or more time of flight interference parameters may comprise a physical uplink shared channel not acknowledged (PUSCH NACK) rate and the analyzer 218 may compare the PUSCH NACK value during a first ROP with the PUSCH NACK baseline rate which comprises an average PUSCH NACK value for each ROP of the past 48 hours prior to the first ROP; if the PUSCH NACK value during the first ROP is more than a threshold percentage (e.g., 10%, 20%, or any other carrier-configurable value) in excess of the baseline PUSCH NACK values, then the analyzer 218 may determine that time of flight interference is occurring in the coverage area of the cell site 214 during the first ROP.

The analyzer 218 may also be configured to determine the identity of an offending base station, whose signals are causing time of flight interference within the coverage area of the cell site 214. In a first aspect, the analyzer 218 may identify the offending cell based on a physical cell identifier (PCI) or any other cell identifying value that is transmitted in the downlink signals being emitted by the offending base station. In such an aspect, the downlink signals from the offending base station may be received by the cell site 214 or any other device configured to receive and process downlink signals that is located in the coverage area served by the cell site 214. In a second aspect, the analyzer 218 may identify the offending cell using lines or ranges of bearings. Because the cell site 214 comprises a plurality of antenna arrays that are each configured to face a different direction, the analyzer may determine that a set of potentially offending base stations are in the direction of where the antenna array receiving the interference is facing. For example, assume that the first antenna array 230 is facing due north (0 degrees true), the second antenna array 232 is facing 120 degrees true, and the third antenna array 234 is facing 240 degrees true; if the one or more time of flight interference parameters are detected by the first antenna array or within a first sector of cell site 214 that is served by the first antenna array 230, then it may be assumed that the offending base station is a member of a set of potentially offending base stations that is within the detection/service range of bearings of the first antenna array 230. Accordingly, if the first antenna array 230 is configured to operate in a range of bearings from 300 degrees true to 60 degrees true, all base stations within a carrier-defined range of the cell site 214 within a range of bearings from 300 degrees-60 degrees may be identified as being in the set of potentially offending base stations. Though less accurate than using a cell identifier, the offending base station will be included in the set of potentially offending base stations. In a related aspect, if the analyzer 218 can determine that a group of user devices served by the first antenna array 230 are generally aligned along a ducting axis having a line of bearing to the first antenna array 230, the set of potentially offending base stations may be limited to base stations within a carrier-defined range of the cell site 214 along or within a carrier-defined proximity to the ducting axis (e.g., if 100 user devices are served by the first antenna array 230 and only 10 devices situated within 5 degrees of 0 degrees true are reporting threshold high time of flight interference parameters, then the ducting axis may be 0 degrees true and the set of potentially offending base stations limited to base stations on or desirably proximate to a line of bearing of 0 degrees from the cell site 214). In a final aspect, the analyzer 218 may identify a set of potentially offending base stations based on an above aground height of emitters within a carrier-defined range. For example, the analyzer 218 may define the set of potentially offending base stations as being every base station having an emitter situated more than 200 feet above ground level within 200 miles of the cell site 214.

The optimizer 220 is generally configured to implement one or more time of flight mitigation measures. The one or more mitigation measures comprise adjusting the downward tilt of the downlink signals transmitted by the offending base station or the set of potentially offending base stations and reducing the transmission power of said downlink signals. The one or more mitigation measure may be implemented stepwise or all at a single time; for example, an offending base station may be identified after one or more time of flight interference parameters is 20% greater than baseline for three consecutive ROPs. In a subsequent ROP, which may be referred to as a first mitigation time period, the offending base station may have its downlink signals downward tilted a first increment (e.g., 2 degrees), electronically through beamforming, physically, or a combination. After the first mitigation time period, the one or more time of flight interference parameters are measured for another 3 ROPs; if they are still greater than 20% over baseline, the offending base station may be tilted downward a second increment (e.g., 2 additional degrees). After the second mitigation time period, the one or more time of flight interference parameters are measured for another 3 ROPs; if they are still greater than 20% over baseline, the offending base station may have its downlink transmission power reduced by a first increment (e.g., 1-3 dBm). Whether incrementally implemented or implemented all at once, the optimizer 220 will continue to instruct the offending base station to implement mitigation measures until the one or more time of flight interference parameters is less than 20% over baseline. Finally, the optimizer 220 is configured to implement a restoration procedure. The restoration procedure may be incremental or total and may begin after a carrier-defined hold-off period (e.g., hours, days, or weeks). If incremental, the restoration procedure may be a reverse of the mitigation measures, wherein the offending base station is partially restored stepwise and the one or more time of flight interference parameters re-checked to ensure that the restoration procedure is not also re-initiating the time of flight interference in the victim base station.

Figure 3A:
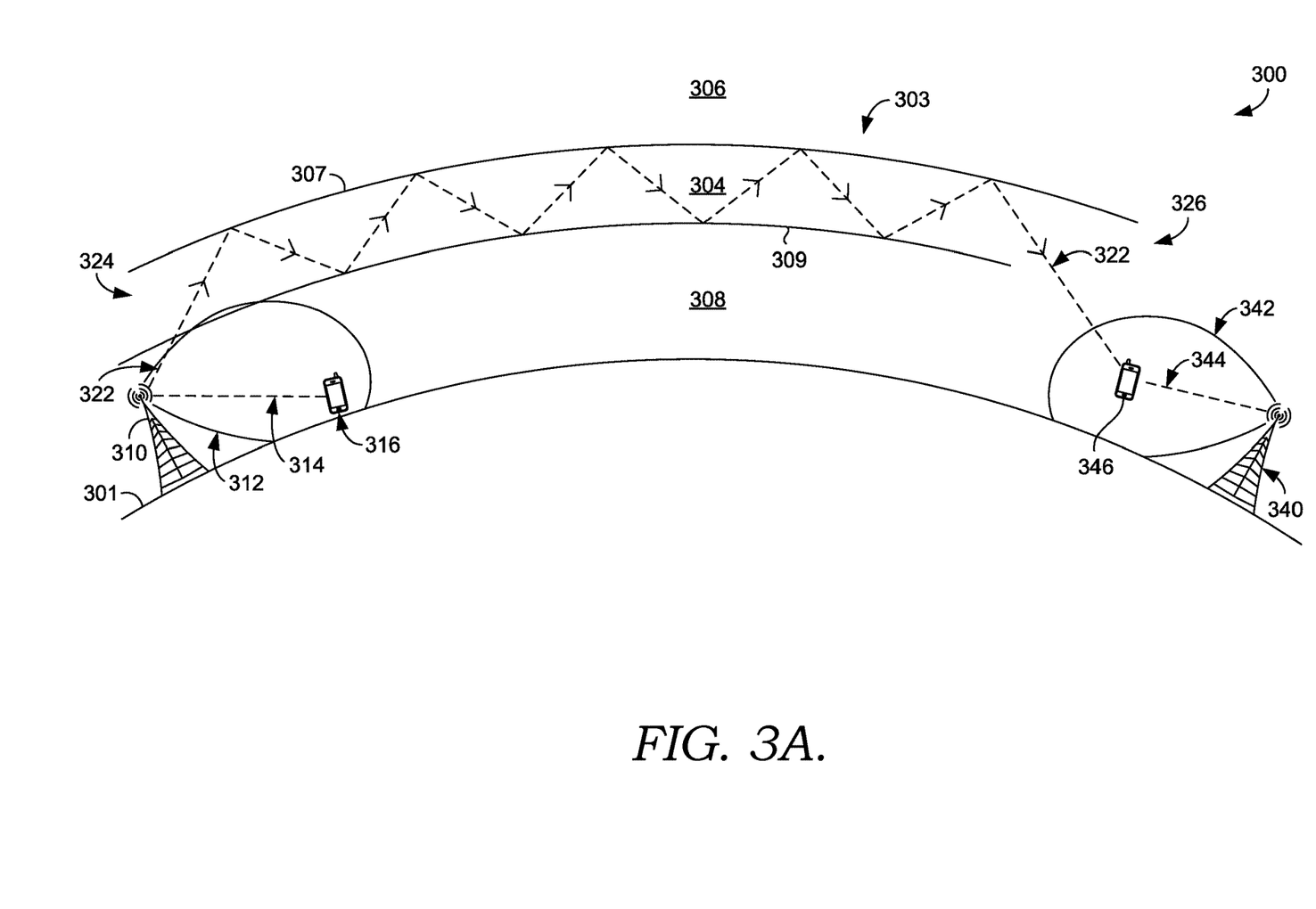
FIGS. 3A-3B each depict a graphical representation of a plurality of base stations and vertical cross sections of beamforms produced by antennas thereon with respect to atmospheric-based ducting, in accordance with an embodiment of the present technology.

Turning now to FIG. 3A, an example of the present disclosure is illustrated. The exemplary system 300 comprises a first base statin 310, a second base station 340, and a plurality of user devices. The system 300 comprises a meteorologic condition 303 occurring or proximate to the first base station 310, wherein the first base station 310 provides coverage for a plurality of user devices. In the illustrated aspect, the meteorologic condition 303 is a tropospheric duct, that is, a first air mass 306 and a third air mass 308 are cooler (e.g., temperature) and/or dryer (e.g., humidity characteristics) than a second air mass 304, wherein the second air mass 304 is disposed between the first air mass 306 and the third air mass 308. Though a tropospheric duct 303 may be formed in several ways, the meteorologic condition is common when an air mass located at a first elevation measured from the earth's surface or the ground level 302 cools faster than another air mass located at a second, higher elevation measured from the ground level 302. Though the boundaries may not be rigidly defined, the tropospheric duct may be said to generally be defined by a first boundary layer 307 separating the first air mass 306 from the second air mass 304 and a second boundary layer 309 separating the second air mass 304 from the third air mass 308. For the purposes of the present disclosure, the tropospheric duct 303 may also be said to define an entrance 324 and an exit 326, wherein the entrance 324 and the exit 326 represent the horizontal extent of the tropospheric duct 303 and are defined with respect to the tropospheric duct 303 and its impact on an RF signal emitted from the first base station 310.

The system 300 comprises at least the first base station 310. The first base station 310 may be said to emit one or more RF signals having a first downlink signal transmission profile 312. The downlink transmission profile is the result of an orientation of a downlink signal and the transmission power. As used herein, the term "orientation," when discussed with respect to one or more downlink signals may refer to a physical orientation (angles of the one or more antennas with respect to a reference point, such as the ground, a ground plane, tower, and the like) and/or an electrical orientation (phases and/or amplitudes of the one or more emitted RF signals, and resultant beamforms of the one or more antennas). The first downlink signal transmission profile 312 may be said to be designed to serve a plurality of user devices within a first coverage area. For example, as seen in FIG. 3, the first coverage area may comprise a first user device 316. The first base station 310 may be said to propagate the one or more RF signals across the entirety of the first downlink transmission profile 312. That is, the first user device 16 may communicate with the first base station 310 via a first portion 318 of the first downlink transmission profile 312. As used herein, a "portion" of a beam form may refer to a cross-section of the beamform in space, which may be realize as a wireless communication link between an emitter (e.g., base station) and remote user destination (e.g., user device) disposed within the beamform. If not mitigated, a second portion 322 of the first downlink transmission profile 312 may also be emitted such that it enters into the entrance 324 of the tropospheric duct 303. Once the second portion 322 of the first beamform 312 has entered into the tropospheric duct 303, it may be reflected or refracted within the second air mass 304 by the first boundary 307 and/or the second boundary layer 309 until it exits the tropospheric duct 303 at the exit 326. Thus, the second portion 322 of the first beamform 312 may be received by a second user device 346, wherein the second user device 346 is intended to be served by the second base station 340, i.e., the second user device 346 is not intended to be served by the first base station 310 because the second user device 346 is located outside the baseline coverage area of the first base station 310.

The second user device 346 may not be capable of processing the second portion 322 of the first downlink transmission profile 312 but it may cause interference to an uplink transmission 344 by the second user device 346, resulting in potentially significant service degradations. The second base station 340 may, prior to this example have a baseline measurement of one or more time of flight interference parameters comprising a PUSCH NACK rate, an UL RLC PDU re-transmission rate, a VoLTE access failure rate, an UL interference over thermal noise, and a VoLTE drop rate. One or more values may be collected and used to represent each ROP for a carrier-defined baseline period (e.g., one day, one week, or one month). During the meteorologic event 303 the second base station may detect that each of the one or more time of flight interference parameters are greater than a threshold greater (e.g., 20%) than their respective baseline values for three consecutive ROPs, the second base station 340 may determine that a time of flight interference event is occurring. The second base station may identify the first base station 310 as the offending base station based on an ability to decode a PCI from the signal 322 received at the second base station. In response, one or more computer processing components, such as the mitigation engine 212 of FIG. 2, will implement one or more mitigation measures on the first base station 310.

Figure 3B:
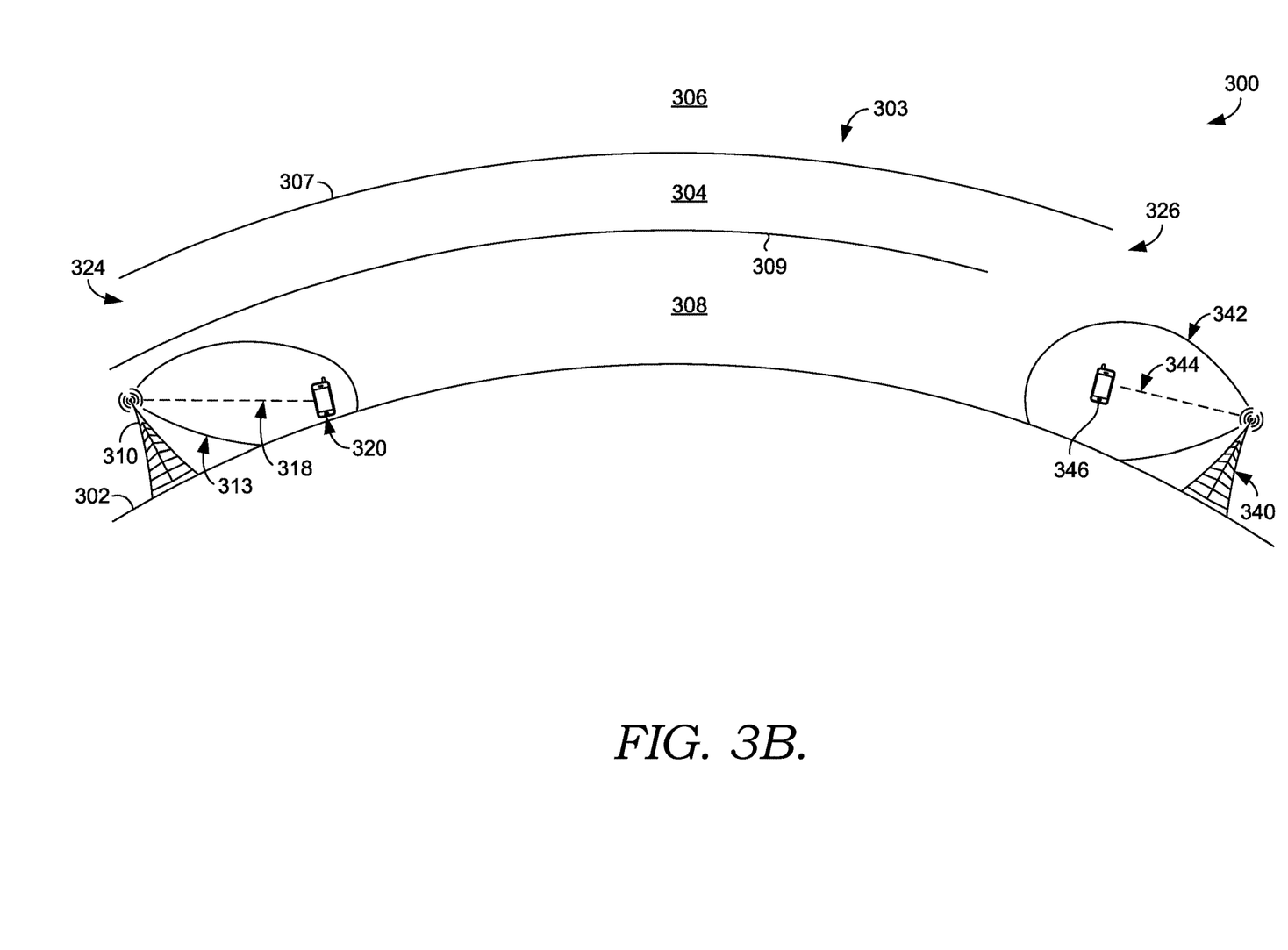

Turning now to FIG. 3B, the system 300 is shown, illustrating the one or more mitigation measures being implemented. After the three ROPs where the one or more time of flight interference parameters exceeded the predetermined threshold, the first base station may modify its downlink transmission profile in a first mitigation time period. In the first mitigation time period, the first base station 310 may tilt its antennas or beamform its transmission downward towards the ground 302 and away from the meteorologic condition 303, creating a second downlink transmission profile 313. For three ROPs after the first mitigation time period, the one or more time of flight interference parameters are re-measured; if they continue to be greater than the predetermined threshold difference over baseline, the first base station will have a second downward tilting in a second mitigation time period. The mitigation measure and re-measurements will continue using any combination of downward tilting of the downlink transmissions or power reductions of the downlink transmissions until the second downlink transmission profile results in the time of flight interference parameters to be below the predetermined threshold (e.g., by preventing any portion of the signal from the first base station from entering the meteorologic condition 303). After a carrier-defined hold-off period (e.g., 1 day), the first base station 310 may at least partially revert the second downlink transmission profile 313 to the first downlink transmission profile 312 (e.g., during a maintenance period), wherein the one or more time of flight interference parameters are measured after each partial reversion to ensure that the time of flight interference parameters do not re-exceed the predetermined threshold.

Figure 4:
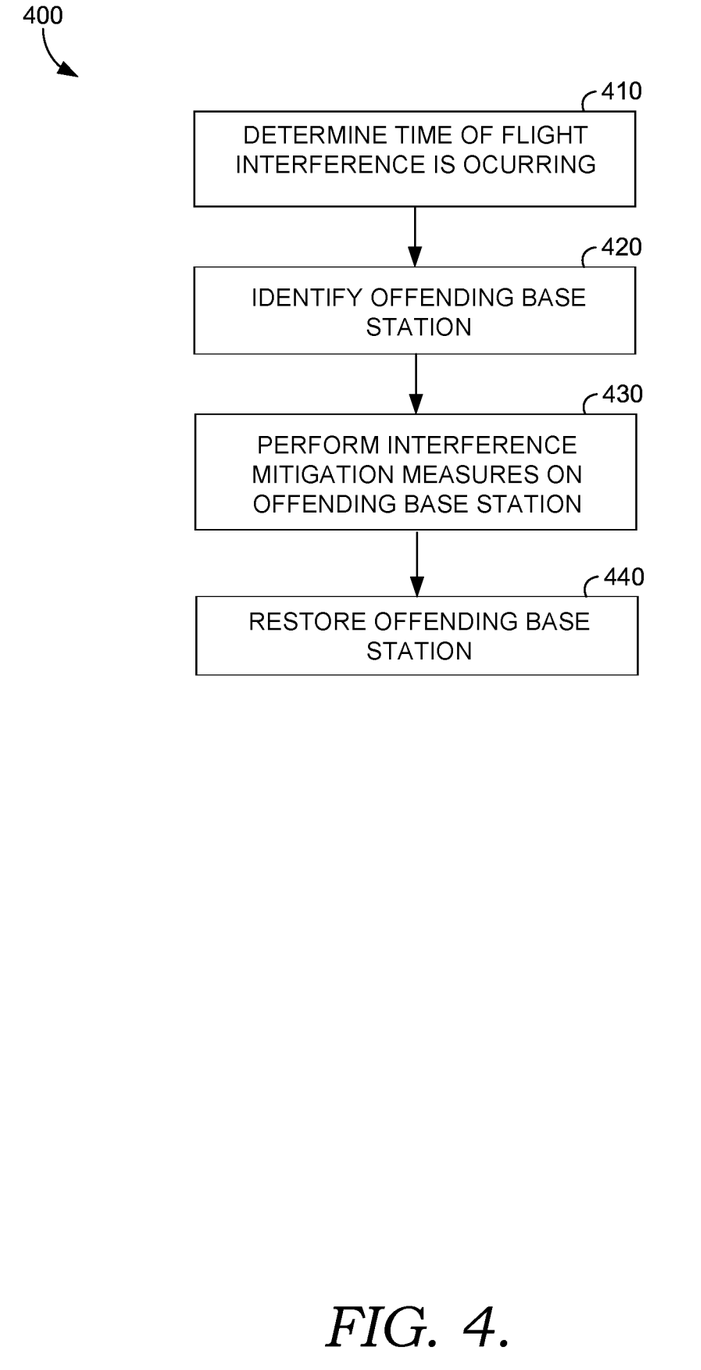
FIG. 4 depicts a block diagram of an exemplary method of mitigating the effects of a meteorologic event on the propagation of an RF signal, in accordance with an embodiment of the present technology.

Turning now to FIG. 4, an exemplary method 400 for determining that time of flight interference is occurring and mitigating said interference is presented. At a first step 410, it is determined that time of flight interference is occurring, in accordance with any one or more aspects described with respect to FIGS. 2-3B (e.g., that one or more time of flight interference parameters are greater than a threshold percentage greater than a baseline). At a second step 420, the offending base station or a set of potentially offending base stations is identified in accordance with any one or more aspects discussed with respect to FIG. 2. At a third step 430, one or more interference mitigation measures is performed on the offending base station or on each base station of the set of potentially offending base station, in accordance with any one or more aspects discussed with respect to FIGS. 2-3B. At a fourth step, the offending base station is at least partially restored or reverted towards its original transmission profile, in accordance with any one or more aspects discussed with respect to FIGS. 2-3B.

Many different arrangements of the various components depicted, as well as components not shown, are possible without departing from the scope of the claims herein. Embodiments of the technology have been described with the intent to be illustrative rather than restrictive. Alternative embodiments will become apparent to readers of this disclosure after and because of reading it. Alternative methods of implementing the aforementioned subject matter may be performed without departing from the scope of the claims herein. Certain features and sub-combinations are of utility and may be employed without reference to other features and sub-combinations, which is contemplated as within the scope of the claims.

What is claimed is:

1. A system for mitigating time of flight interference in a wireless telecommunication environment comprising:
   a first base station configured to transmit a first set of downlink signals to a first coverage area using one or more antennas, the first set of downlink signals having a first downlink profile; and
   one or more computer processing components configured to perform operations comprising:
   determining that the first base station is causing time of flight interference in a second coverage area based on one or more time of flight interference parameters exceeding a predetermined threshold in the second coverage area;
   identifying the first base station by detecting the one or more time of flight interference parameters on a first antenna array of a second base station;
   identifying a set of potentially offending base stations comprising the first base station based on the set of potentially offending base stations being located within a range of bearings associated with a directional face of the first antenna array; and
   communicating an instruction to the first base station to transmit a second set of downlink signals to a third coverage area using the one or more antennas, the second set of downlink signals having a second downlink profile, wherein the first coverage area comprises the third coverage area.

2. The system of claim 1, wherein the one or more time of flight interference parameters are measured at the second base station, the second base station configured to serve the second coverage area.

3. The system of claim 1, wherein the one or more time of flight interference parameters comprises a physical uplink shared channel failure rate.

4. The system of claim 3, wherein the one or more time of flight interference parameters further comprises an uplink radio link control packet data unit re-transmission rate.

5. The system of claim 4, wherein the one or more time of flight interference parameters further comprises a voice over radio access technology access failure rate.

6. The system of claim 5, wherein the one or more time of flight interference parameters further comprises uplink interference over thermal noise.

7. The system of claim 6, wherein the one or more time of flight interference parameters further comprises a voice over radio access technology drop rate.

8. The system of claim 7, wherein determining that the first base station is causing time of flight interference in the second coverage area is further based on the one or more time of flight interference parameters exceeding the predetermined threshold in the second coverage area for two or more consecutive reporting output periods.

9. The system of claim 1, wherein the one or more time of flight interference parameters further comprises a distance between the first base station and the second base station.

10. The system of claim 1, wherein the first downlink profile comprises a first downlink beamform and the second downlink profile comprises a second downlink beamform, the second downlink beamform being down tilted relative to the first beamform.

11. The system of claim 1, wherein the first downlink profile comprises a first maximum downlink transmission power and the second downlink profile comprises a second maximum downlink transmission power, the second maximum downlink transmission power being less than the first maximum downlink transmission power.

12. The system of claim 1, wherein identifying the first base station comprises identifying a physical cell identifier in a downlink signal received from the first base station in the second coverage area.

13. The system of claim 12, wherein the physical cell identifier is identified by the second base station receiving the downlink signal.

14. The system of claim 1, wherein the one or more time of flight interference parameters are measured during a maintenance time period.

15. A method for mitigating time of flight interference in a wireless telecommunication environment, the method comprising:
    determining that a first base station is causing time of flight interference in a second coverage area based on one or more time of flight interference parameters exceeding a predetermined threshold in the second coverage area;
    identifying the first base station by identifying a set of potentially offending base stations having emitters a greater than threshold height above ground level; and
    communicating an instruction to the first base station to transmit a second set of downlink signals to a third coverage area using one or more antennas, the second set of downlink signals having a second downlink profile, wherein the first coverage area comprises the third coverage area.

16. The method of claim 15, wherein the one or more time of flight interference parameters are measured at a second base station, the second base station configured to serve the second coverage area.

17. The method of claim 15, wherein the one or more time of flight interference parameters comprises a physical uplink shared channel failure rate.

18. The method of claim 15, wherein the one or more time of flight interference parameters further comprises an uplink radio link control packet data unit re-transmission rate.

19. One or more computer-readable media having computer-executable instructions embodied thereon that, when executed, perform a method for mitigating time of flight interference in a wireless telecommunication environment, the method comprising:
    determining that a first base station is causing time of flight interference in a second coverage area based on one or more time of flight interference parameters exceeding a predetermined threshold in the second coverage area;
    communicating an instruction to the first base station to transmit a second set of downlink signals to a third coverage area using one or more antennas, the second set of downlink signals having a second downlink profile, wherein the first coverage area comprises the third coverage area; and
    determining whether the one or more time of flight interference parameters have improved in a time period that is two or more reporting output periods after communicating the instruction to the first base station to transmit the second set of downlink signals to the third coverage area using the second downlink profile.

20. The one or more computer processing components of claim 19, wherein the one or more computer processing components are further configured to instruct the first base station to perform one or more restoration procedures based on the determination that the one or more time of flight interference parameters have improved in the time period.

* * * * *